July 6, 1943.    W. C. LINDEMANN ET AL    2,323,821
OVEN AND BROILER
Filed Jan. 30, 1940
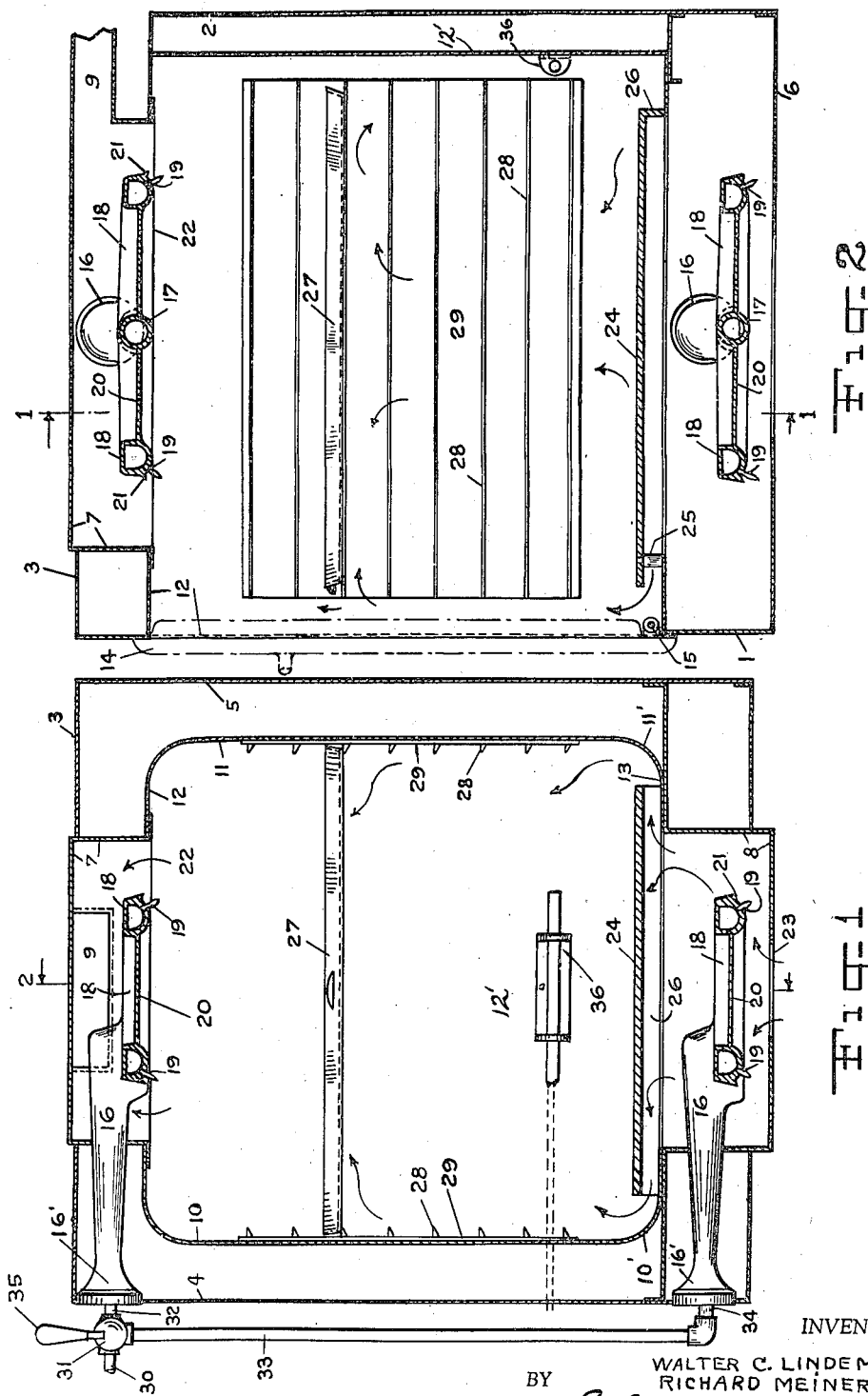
INVENTORS.
WALTER C. LINDEMANN.
RICHARD MEINERS.
BY
ATTORNEY.

Patented July 6, 1943

2,323,821

UNITED STATES PATENT OFFICE 2,323,821

OVEN AND BROILER

Walter C. Lindemann and Richard Meiners, Milwaukee, Wis., assignors to A. J. Lindemann & Hoverson Company, Milwaukee, Wis., a corporation of Wisconsin Application January 30, 1940, Serial No. 316,312

3 Claims. (Cl. 126—39)

The improvements relate to ovens and similar heating or cooking compartments designed to be supplied with heat by radiation and convection by gaseous fuel burners therein and when so equipped designed for baking, broiling and analogous operations. Their primary object is to produce an oven of this type of simple and serviceable construction which will economize fuel, provide for a better distribution and application of heat under various conditions and for various purposes and generally produce better results than the ovens at present in use.

It has long been recognized that the uniform distribution of heat throughout ovens of this kind presents serious problems, which have never been completely solved. One of these problems arises from the fact that while an oven must be made of sufficient size to accommodate a very large roast or dish to be baked it is used the greater part of the time for the cooking or roasting of food units which require only a smaller percentage of its capacity, so that the entire oven must be heated and maintained at the proper temperature while only part of it is needed. This is not only wasteful of fuel but under some conditions produces unsatisfactory results due largely to inequalities in temperature and the presence of currents of air and combustion products in the unused space and maintained by the thermal difference between the article which is being cooked and the oven itself, and the constant absorption of oven heat by the latter. Another is due to the fact that it is not feasible when gaseous fuel burners are employed to provide for the diffusion of heat over the walls of the oven as is commonly done in ovens forming part of a solid fuel stove or range but is necessary to apply the heat in a more or less direct manner which works against thorough and uniform cooking. It is well known that for the best cooking, there should be not only a distribution of heat over the article to be cooked by convection but by radiation, as in the ordinary solid fuel oven with a distribution of heated air and combustion products around its exterior. In the broiling operation similar problems have long existed, and it has been recognized that the common use of ovens for that purpose has its disadvantages and is under some conditions attended with unsatisfactory results, due to the fact, among others, that the desired cooking is not attained wholly by direct heat but to a greater or less extent indirectly by the temperature of the gases diffused throughout the oven.

The solution of these problems to a degree not heretofore obtained is the principal object of the present improvements. There are other objects and advantages which will appear to those familiar with the subject matter.

The improvements are illustrated in the accompanying drawing in which—

Fig. 1 is a vertical section of the preferred embodiment of the improvements on the line 1—1 of Fig. 2 looking in the direction indicated by the arrows; and Fig. 2 is a transverse vertical section substantially on the line 2—2 of Fig. 1.

In the embodiment shown the gas connections are so arranged that only one burner at a time can be operated but both burners can be maintained closed. This is accomplished by a connection between the gas cocks of the burners whereby when one is opened the other is closed if in open position, and vice versa, which while it has peculiar functions in the present improvements is an arrangement well known and used in the art and therefore need not be shown or described in detail. It is indicated, however, in Fig. 1 in which there is shown a gas supply pipe 30 leading into a two-way cock 31 controlling communication with the mixer 16' of the upper burner through the pipe 32 and with the lower or oven burner through a vertical pipe 33 and its horizontal pipe 34. The handle 35 controls this two-way cock, and is turned in one direction for communication between the supply pipe 30 and the upper burner while the lower pipe 34 is closed and turned in another direction to open the pipe 34 with the pipe 32 closed. There is also a neutral position in which both pipes are closed, but no position in which both may be open at the same time. The location of the parts last described and the tube 16 with respect to the front of the oven is optional.

In the drawing, 1, 2, 3, 4, 5 and 6, represent the front, rear, top, side and bottom outer walls of the oven, 7 and 8 show the top and bottom burner housings and 9 the flue leading from the upper burner housing. 10, 11, 12 and 13 are the two side, top and bottom inner oven walls and 14 the oven door which swings outwardly and downwardly on a hinge 15 at its bottom.

Each burner consists of a tube 16 for supplying gas thereto, a central distributing tube 17 and a continuous tube 18 extending around and in communication therewith having numerous jet orifices 19 in its bottom at which combustion occurs and from which the flames of the burner are projected. The tubes 17 and 18 are connected by a horizontal plate or web 20 closing the spaces between them so that all air passing the burners must pass around their outer edges. A flange or ledge 21 extends around each tube 18 near its bottom and outside the jets 19, so that secondary air passing over the burner is deflected to some extent and so that it does not impinge directly on the jets of combustion issuing therefrom.

The upper burner housing 7 has an open—or foraminous—bottom 22, through which the heated gases rising may pass around the broiler burner to the flue 9, while the lower burner housing 8 has a central aperture 23 in its bottom and is open at the top, a plate 24 being positioned over this open top so as to cover and extend beyond it. This plate is supported by short posts 25 at its forward end and by a strip 26 at its rear upon the inner bottom 13 of the oven, and by which it is elevated therefrom. It is also spaced from the front sides and back of the inner oven. In this manner heated air and combustion products passing over and issuing from the bottom or roasting burner are permitted freely to pass upwardly from the said burner housing but are spread and directed against the walls of the oven so that instead of coming in contact with the articles to be cooked they pass upwardly along the said walls to above mid heighth, or until they are deflected by the adjustable partition 27. The plate 24, which is preferably a piece of cast metal of considerable thickness and is heated to a high temperature in the normal operation of the oven for baking or roasting, radiates heat upwardly, and when the burner is turned down, through the operation of the temperature control or manually, it continues to supply heat both by radiation and convection.

It will be noted that the space between the oven bottom and the plate 24 is closed at the back of the oven so that no heated air or combustion products can pass therethrough, and so that they will be directed only against and over the inner side walls and front of the oven, the front being formed mainly by the door 14, which door when opened to baste or turn food being cooked or for other purpose, will necessarily permit the entrance of cold air into the oven and permit the escape of heated air and other gas. It will also at this time be materially chilled by exposure to the outside atmosphere. It is therefore of importance that the temperature of the inner plate of the oven door shall be raised substantially to that of the other oven walls quickly when the door is closed, and this is accomplished by the passage of the heated gases upwardly over its smooth inner surface, against which it is directed by the plate 24.

The circulation of the hot gases is indicated by arrows, and it will be seen that they pass up over the front and sides of the oven as well as into the interior of the oven until they are deflected laterally, and downwardly at the back, by the adjustable partition 27 so that a constant movement is maintained in all directions. The corners of the ovens are rounded, as indicated at 10' and 11' to promote this movement. The gases deflected toward the rear, however, are not diverted by any currents rising from the back of the plate 24 and therefore may move downwardly to a certain extent until they reach a point near the bottom, where they are again carried upwardly by the gases issuing from the sides of the said plate. In this manner a constant circulation and diffusion of the hot gases is maintained which will cause their heating effect to be produced on all sides of the food being cooked.

A portion of the hot gases also passes the partition 27 at its edges, which are spaced from the walls of the oven front and back, and will pass through the open bottom 22 of the upper burner housing, which is also in effect part of the oven top, to the flue 8. This last movement of the gases is retarded to some extent by the top burner, which, being substantially an imperforate disk of considerable area, diverts the gases impinging against it laterally. Thus, the retarding and deflecting effect of the partition 27 and the top burner with the spaces between its tubular members closed by the plate 20 holds the gases in the oven and prevents them from passing freely therethrough until their heat units have been absorbed largely by the food being cooked.

The partition 27 is in the form of a shallow pan, which in the broiling operation will catch the drip from the meat or other food being broiled. It is supported in the usual way on the spaced horizontal flanges 28 on the vertical plate 29 secured to the inner oven walls, and may therefore be positioned at various levels between the upper and lower part of the oven. When so positioned it forms in effect the oven top for roasting or baking and the oven bottom for broiling, and enables the user to employ substantially a portion of the oven only, according to the size of the article being cooked, and to concentrate the heat on that article. It also enables the user to produce the desired temperature without wasting fuel and to cook more uniformly. One or more of these partitions 27 may be used.

Among the advantages attained by the present improvements, in addition to those hereinbefore noted, is the provision of a zone in which the temperature control bulb or other device may be located so as to get approximately the mean cooking temperature of the oven. This zone is at the same side of the compartment as the closed end of the plate 24 and in the lower part of said compartment. Another is the provision of means for dividing the cooking compartment so as to form in effect two compartments having different temperatures and therefore capable of use simultaneously for distinctly different cooking operations. Thus, with the partition 27 in position and the lower burner in operation the temperature above the partition is much lower than the temperature below it, and the upper part of the oven may be used for one type of baking or other cooking—for example, baking cake layers—while the lower part may be used at the same time for another type—for example, the baking of heavy cake or pie—both operations being carried on at the same time and for the same period of time and both being governed by the one thermostatic control. The preferred location and type of the temperature control device—such devices being well known and commonly used—are indicated at 36, on rear inner oven wall 12'.

Various modifications of the embodiment of the improvements herein described and shown may be made without departing from the scope of the invention, as, for illustration, the employment of foraminous portions where openings or spaces are indicated, variation in the form and arrangement of the flue, and in the particular location of the burners. It will also be understood that features designed to facilitate the practice of the invention and better realize its advantages may be added, including means to enable the user to gauge the relative temperatures of the upper and lower sections of the oven with the partition in different positions. The appended claims must therefore be construed to include a fair range of equivalents and to cover the use of the invention as claimed therein, with such modifications and additions to the embodiment shown as may be devised by those skilled in the art, to adapt them to different or a wider range of uses or obtain more accurate or perfect results.

While the improvements as shown and described are embodied in an oven having a lower oven burner and an upper broiler burner, it will be understood that the most important features of the improvements may be embodied in an oven or the like without an upper burner. It is also apparent that the particular means shown for protecting from direct heat of the burner the temperature responsive device for controlling the heat of the oven while highly effective and advantageous may be varied and other means to this end employed. It is important, however, that this device be located well below mid height of the oven and its preferred location is in the bottom quarter thereof.

It has been found in practice that the parts as shown in the drawing are approximately correct in size, proportions and arrangement and produce excellent results. However, equally good if not better results can be attained by making the baffle plate 24 10 to 20 percent less in both diameters and reducing the space at front and back of the partition 27 about one-third. Such variations will depend largely on the size and capacity of the burner, which should be such as to produce and maintain a temperature as high as 500° F. in the lower compartment.

What we claim is:

1. In an oven, a burner device at the bottom thereof in communication with and adapted to supply heat for the oven, a horizontal deflecting plate between said device and the bottom of the cooking space of the oven, there being passages between it and the walls of the oven to permit the passage of heated gases, a horizontally arranged partition in said oven above the said plate substantially closing the space between vertical walls of the oven and dividing the oven into upper and lower communicating cooking compartments above said plate, there being passages around said partition having a substantially smaller area than those of said plate permitting passage of heated air and combustion gases from the burner through said lower compartment past said partition to the upper compartment and maintaining a lower range of effective cooking temperatures in said upper compartment than in said lower compartment for the cooking of different kinds of food simultaneously.

2. In an oven, a burner device at the bottom thereof in communication with and adapted to supply heat for the oven, a horizontal deflecting plate between said device and the bottom of the cooking space of the oven there being passages between it and the walls of the oven to permit the passage of heated gases on a plurality of sides, a closure between said plate and an oven wall, a horizontally arranged partition in said oven above the said plate substantially closing the space between vertical walls of the oven and dividing the oven into upper and lower communicating cooking compartments above said plate there being passages around said partition having a substantially smaller area than those of said plate permitting passage of heated air and combustion gases from the burner through said lower compartment past said partition to the upper compartment and maintaining a lower range of effective cooking temperatures in said upper compartment than in said lower compartment for the cooking of different kinds of food simultaneously.

3. In an oven, a burner device at the bottom thereof in communication with and adapted to supply heat for the oven, a horizontal deflecting plate between said device and the bottom of the cooking space of the oven there being passages between it and the walls of the oven to permit the passage of heat and gases on a plurality of sides, a closure between said plate and an oven wall, a horizontally arranged partition in said oven above the said plate substantially closing the space between vertical walls of the oven and dividing the oven into upper and lower communicating cooking compartments above said plate there being passages around said partition having a substantially smaller area than those of said plate permitting passage of heated air and combustion gases from the burner through said lower compartment past said partition to the upper compartment and maintaining a lower range of effective cooking temperatures in said upper compartment than in said lower compartment for the cooking of different kinds of food simultaneously, and a temperature control device above and in proximity to said closure between the plate and the oven wall and below said partition.

WALTER C. LINDEMANN.
RICHARD MEINERS.